United States Patent [19]

Sugano et al.

[11] Patent Number: 4,912,998
[45] Date of Patent: Apr. 3, 1990

[54] GEAR ARRANGEMENT

[75] Inventors: Tadashi Sugano, Saitama; Kazuyuki Mishima, Wako, both of Japan

[73] Assignee: Honda Giken Kogyo Kabushiki Kaisha, Tokyo, Japan

[21] Appl. No.: 256,160

[22] Filed: Oct. 11, 1988

Related U.S. Application Data

[63] Continuation of Ser. No. 37,291, Apr. 10, 1987, abandoned.

[30] Foreign Application Priority Data

Apr. 11, 1986 [JP] Japan .................. 61-53583

[51] Int. Cl.$^4$ ............................................. F16H 55/18
[52] U.S. Cl. .......................................... 74/409; 74/440; 74/446; 74/462
[58] Field of Search .................. 74/409, 440, 460, 461, 74/462, 443, 446

[56] References Cited

U.S. PATENT DOCUMENTS

| | | | |
|---|---|---|---|
| 1,601,750 | 10/1926 | Wildhaber | 74/466 |
| 2,081,644 | 5/1937 | Smythe | 74/440 |
| 2,760,381 | 8/1956 | Pickles | 74/460 |
| 3,304,795 | 2/1967 | Rouverol | 74/462 |
| 3,363,478 | 1/1968 | Lanning | 74/446 |
| 4,530,253 | 7/1985 | Ikemoto et al. | 74/440 |
| 4,577,525 | 3/1986 | Ikemoto et al. | 74/440 |
| 4,619,150 | 10/1986 | Wiggenhauser | 74/460 |
| 4,674,351 | 6/1987 | Byrd | 74/443 |
| 4,688,439 | 8/1987 | Cureton et al. | 74/60 |

FOREIGN PATENT DOCUMENTS

| | | | |
|---|---|---|---|
| 48-44543 | 12/1973 | Japan . | |
| 117868 | 9/1979 | Japan | 74/443 |
| 59-99123 | 6/1984 | Japan | 74/409 |
| 937863 | 6/1982 | U.S.S.R. | 74/446 |
| 1044707 | 9/1983 | U.S.S.R. | 74/446 |
| 1055934 | 11/1983 | U.S.S.R. | 74/446 |
| 153878 | 2/1922 | United Kingdom . | |
| 689638 | 4/1953 | United Kingdom | 74/461 |

Primary Examiner—Leslie A. Braun
Assistant Examiner—Scott Anchell
Attorney, Agent, or Firm—Armstrong, Nikaido, Marmelstein, Kubovcik & Murray

[57] ABSTRACT

In a gear arrangement consisting of two gears meshed with each other, at least one gear is constructed of a teeth portion having teeth along its circumference and a shaft portion adapted to be mounted to a support shaft, a gap space is retained between the teeth portion and the shaft portion, and an elastic body such as an O-ring, an annular spring, etc. is interposed in the gap space. And a tooth thickness of one gear of the above-mentioned two gears is made larger than that of the other gear. When the above-described two gears are meshed with each other, the teeth portion of the gear having the elastic body interposed therein moves in the radial direction with respect to the shaft portion, and thereby the teeth of the respective gears can be meshed without backlash.

7 Claims, 5 Drawing Sheets

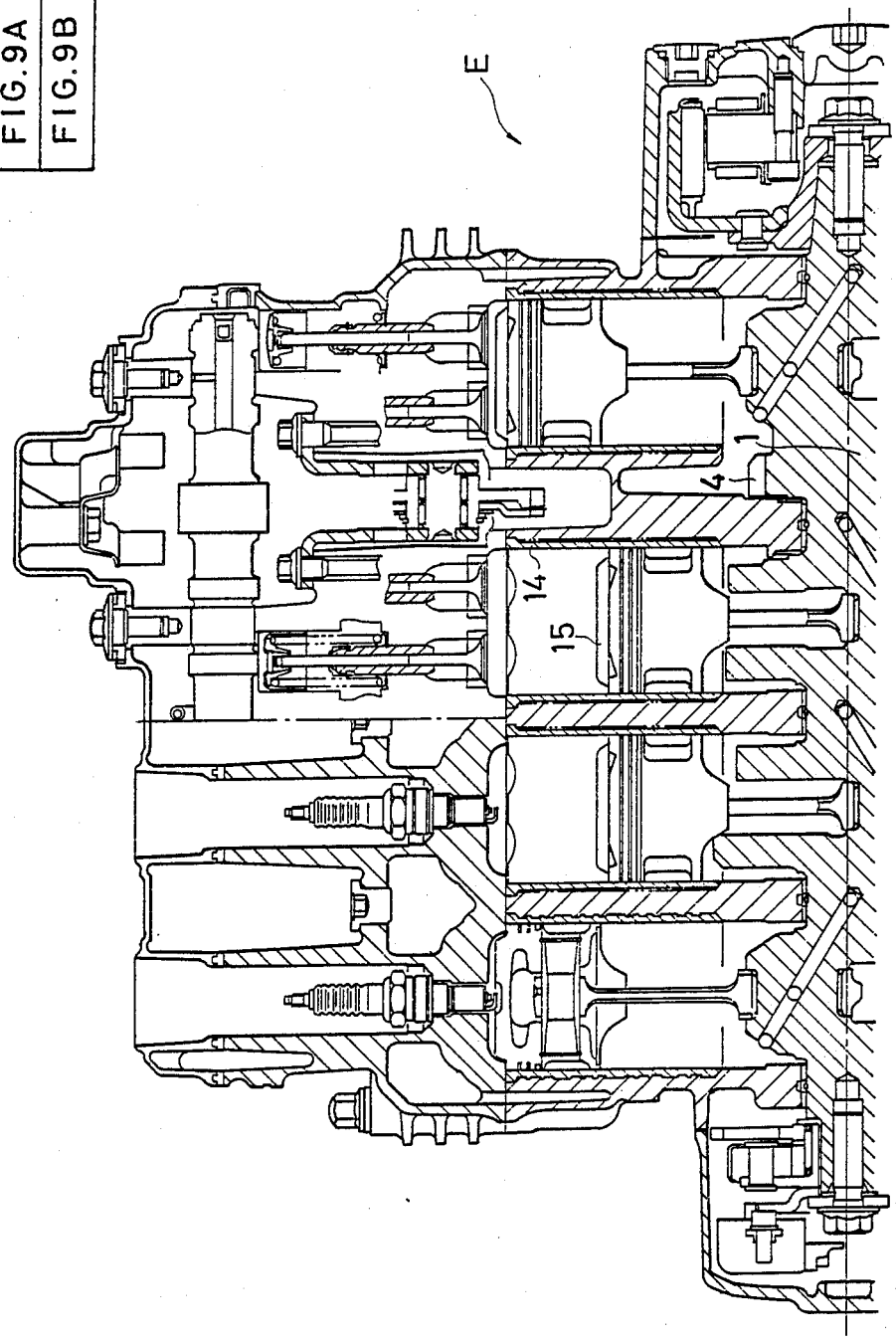

GEAR ARRANGEMENT

This application is a continuation of application Ser. No. 037,291 filed Apr. 10, 1987.

BACKGROUND OF THE INVENTION

The present invention relates to a gear arrangement, and more particularly to a gear arrangement in which backlash between two gears meshed with each other is eliminated.

In a gear transmission arrangement, backlash is intentionally provided between gear faces taking into consideration a machining error of gears and a manufacturing error in a distance between axes of gears. However, because of this backlash, a gear arrangement is liable to generate noises during its operation, and for instance, in the case where a rotational speed of a gear on a driving side varies or its direction of rotation changes, knocking sounds are generated.

For the purpose of eliminating the backlash, a counter-measure was taken in the prior art, for example, such that a gear on a driving side and a gear on a driven side are meshed with each other while providing backlash therebetween, around a shaft of either one gear, for instance, the gear on the driven side is loosely fitted a gear of the same size as the one gear, and these two gears are made to repel each other in the circumferential direction by means of a spring to make the loosely fitted gear also mesh with the gear on the driving side. Since the above-described two gears on the driven side mesh with the tooth on the driving side on the tooth faces on the opposite side to each other, if the strength of the spring is chosen so as to overcome a transmission torque, knocking noises would not be generated even when a direction of rotation changes.

In addition, in Japanese Utility Model Publication No. 48-44543 is disclosed a gear arrangement, in which backlash is eliminated by employing such structure that teeth of one of meshing gears can move a little in the radial direction with respect to a shaft of the one gear by interposing an elastic body or a frictional body such as a rubber, a spring or the like between the teeth and the shaft of the one gear and, by mounting these two gears with the distance between their shafts somewhat shortened as compared to a normal mounting distance.

However, as to the gear arrangement in which two gears made to repel each other in the circumferential direction by means of a spring are meshed with one gear on the opposite side as described above, a necessary number of gear becomes large, also the mechanism becomes complex, and hence the cost of the gear arrangement would become high.

Furthermore, with regard to the backlash eliminating means disclosed in Japanese Utility Model Publication No. 48-44543, since the distance between the shafts of the two gears must be shortened, in the case where it is intended to change a gear arrangement in the prior art to this gear arrangement incorporating the backlash eliminating means, the positions of bearings must be also changed. Especially in the case of a gear arrangement associated with an engine, positions of bearing holes on an engine block must be changed, and therefore, change of machining jigs would accompany therewith, so that many problems are involved.

SUMMARY OF THE INVENTION

It is therefore one object of the present invention to provide a gear arrangement in which backlash can be eliminated by means of a simple structure without increasing a number of gears.

Another object of the present invention is to provide a gear arrangement that is free from backlash, which can be replaced for a conventional gear arrangement without changing a distance between gear shafts nor gear diameters, nor without necessitating change of machining of bearing holes at all.

To that end, according to the present invention, at least one of the gears meshed with each other is constructed in such manner that a teeth portion is movable in the radial direction with respect to a shaft portion by interposing an elastic body between the teeth portion and the shaft portion, and a tooth thickness of one gear is made larger than that of the other gear, so that the respective gears may be meshed in a non-backlash condition.

In the gear arrangement according to the present invention also, like the above-described gear arrangement disclosed in Japanese Utility Model Publication No. 48-44543, a teeth portion of one gear is movable in the radial direction and is pressed against the other gear by an elastic body interposed between the teeth portion and a shaft portion, and thereby backlash can be eliminated. However, according to the present invention, since a tooth thickness (a thickness along a circumferential direction, hereinafter also so) of one gear is larger than that of the other gear, a distance between shafts of the respective gears when the thicker tooth has meshed between the teeth of the other gear without backlash would become longer than the distance between shafts in the conventional gear arrangement in which the tooth thicknesses of the respective gears are equal to each other. This difference in the distance between shafts is absorbed by elastic deformation of the above-mentioned elastic body. In other words, according to the present invention even if the distance between shafts of the respective gears is chosen equal to the regular distance between shafts of the conventional gear arrangement, the respective gears would press against each other with a sufficient elastic force as a result of deformation of the elastic body, and thus, a non-backlash meshing condition can be realized.

Hence, a conventional gear arrangement can be replaced by the gear arrangement according to the present invention without changing a distance between shafts nor gear diameters, and at that time, change of machining of bearing holes is unnecessary at all.

In the gear arrangement in which backlash eliminating means is provided in the above-described manner, a torque is transmitted from the shaft portion to the teeth portion or from the teeth portion to the shaft portion by the intermediary of the elastic body. Accordingly, in some cases, a sufficient torque cannot be transmitted therebetween, or the shaft portion and the teeth portion tend to slide in the circumferential direction relative to each other via the elastic body, and hence the elastic body is liable to wear. In such case, the above-mentioned slide between the shaft portion and the teeth portion can be prevented by making use of an output rotary member such as a gear, a sprocket or the like which is coaxially and integrally mounted on the side of the gear for transmitting a torque of the gear to another member. More particularly, by engaging the above-mentioned output rotary member with both the teeth portion and the shaft portion of the gear, the slide movement between the teeth portion and the shaft portion can be suppressed to prevent the elastic body from wearing with only simple machining without adding any surplus parts.

BRIEF DESCRIPTION OF THE DRAWINGS

FIGS. 9A and 9B jointly form a cross-section view of a motorcycle engine provided with the same gear arrangement.

DETAILED DESCRIPTION OF THE PREFERRED EMBODIMENTS

Figure 1:
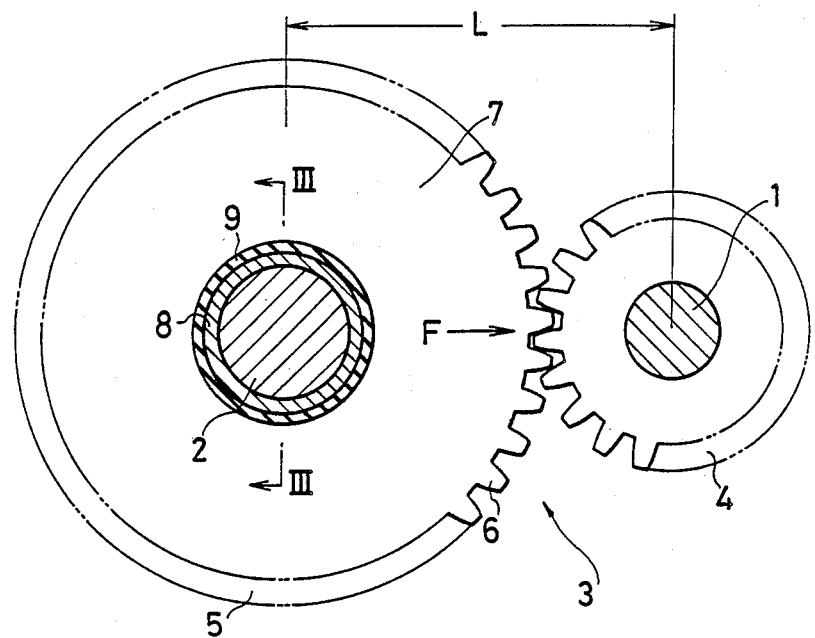
FIG. 1 is a front view partly in cross-section of one preferred embodiment of the present invention.
Figure 3:
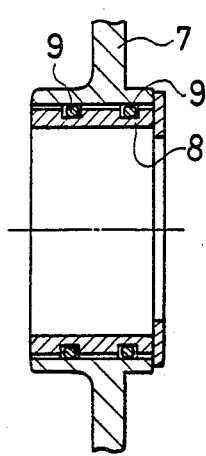
FIG. 3 is a cross-section view of a gear portion taken along line III—III in FIG. 1.

In the following, the present invention will be described in connection to the preferred embodiments illustrated in the accompanying drawings. FIG. 1 shows a gear arrangement 3 provided between a crank shaft 1 and a main shaft 2 in an engine, which forms one preferred embodiment of the present invention. Reference numeral 4 designates a driving gear, which is mounted on the crank shaft 1 and rotates integrally with the crank shaft 1. Reference numeral 5 designates a driven gear, which meshes with the driving gear 4 and is driven by the driving gear 4. The driven gear 5 is supported, for instance, on the main shaft 2 so as to be relatively rotatable, and is coupled to the main shaft 2 via a clutch not shown. This driven gear 5 consists of a teeth portion 7 provided with teeth 6 along its outer circumference and a shaft portion 8 that is supported on the main shaft 2 so as to be relatively rotatable as described above, a gap space is retained between the inner circumference of the teeth portion 7 and the outer circumference of the shaft portion 8, and within this gap space two strips of elastic bodies, that is, O-rings 9, 9 are fitted in a compressed state between the teeth portion 7 and the shaft portion 8 as shown in FIG. 3. Accordingly, the teeth portion 7 can move in the radial direction to a certain extent relative to the shaft portion 8 owing to elastic deformation of the O-rings 9, 9.

Figure 2:
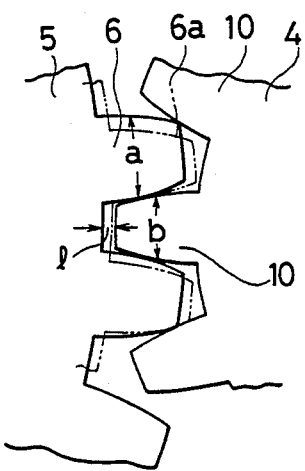
FIG. 2 is an enlarged view showing a meshed portion of teeth in FIG. 1.

Now it is to be noted that a tooth thickness a of the tooth 6 of the driven gear 5 is larger than a tooth thickness b of a tooth 10 of the driving gear 4 as shown in FIG. 2. A chain line 6a depicts a tooth shape of a regular gear adapted to mesh with the teeth 10 of the driving gear 4, and the tooth thickness of this tooth 6a is naturally equal to the tooth thickness b of the tooth 10.

Accordingly, the tooth 6 having a tooth thickness a that is larger than the tooth thickness b comes into contact with the tooth faces of the teeth 10, 10 on the opposite sides at its respective tooth faces when it has entered between the teeth 10, 10 up to a shallower depth than the tooth 6a, and thus a non-backlash condition is realized. At this time, the distance between shafts of the driving gear 4 and the driven gear 5 becomes longer by l than that when the conventional gears mesh with each other. However, in the illustrated gear arrangement 3, since the distance between shafts L is maintained at the regular distance between shafts, the above-described increment l of the distance between shafts is absorbed by displacement of the teeth portion 7 relative to the shaft portion 8 leftwards as viewed in FIG. 1. And, because the O-rings 9 are subjected to elastic deformation and the driven gear 5 is pressed against the driving gear 4 by a reaction force F, a non-backlash meshing condition between the teeth 6 and the teeth 10 can be maintained.

Figure 4:
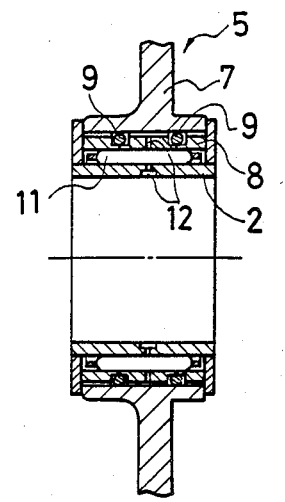
FIG. 4 is a cross-section view similar to FIG. 3 but showing another preferred embodiment of the present invention.

FIG. 4 shows another preferred embodiment of the present invention. In this embodiment, a needle bearing 11 is interposed between the shaft portion 8 of the driven gear 5 and the main shaft 2, also oil is continuously fed from an oil pump through an oil hole 12 to the space between the two O-rings 9, 9 to maintain a hydraulic pressure between the teeth portion 7 and the shaft portion 8, and thereby a damper effect can be obtained.

Figure 5:
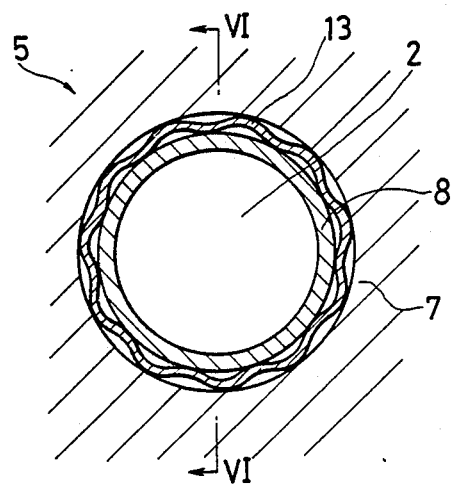
FIG. 5 is a cross-section front view of a gear portion showing still another preferred embodiment of the present invention.
Figure 6:
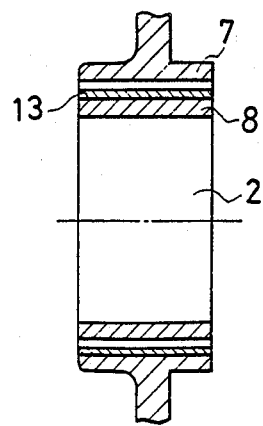
FIG. 6 is a cross-section view taken along line VI—VI in FIG. 5.

FIGS. 5 and 6 show still another preferred embodiment of the present invention. In this embodiment, between the shaft portion 8 and the teeth portion 7 of the gear is interposed a corrugated annular metallic spring 13 serving as an elastic body.

It is to be noted that in the above-described respective embodiments, with regard to the elastic body, its configuration and material are of no matter, any material having an elastic effect such as resin or the like could be employed.

Figure 7:
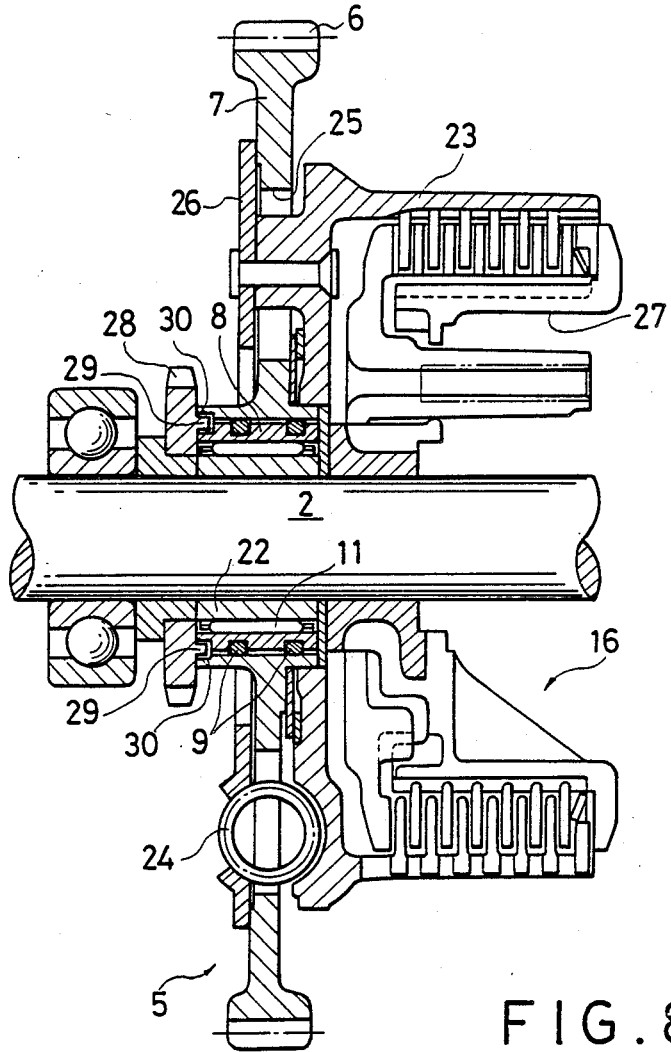
FIG. 7 is a longitudinal cross-section view of a driven gear in a gear arrangement according to a still further preferred embodiment of the present invention.
Figure 8:
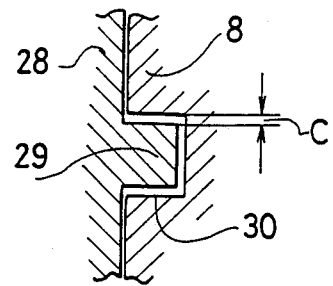
FIG. 8 is a cross-section view taken along a circumferential direction of a meshing portion between an output rotary member and the driven gear in the same gear arrangement.
Figure 9B:
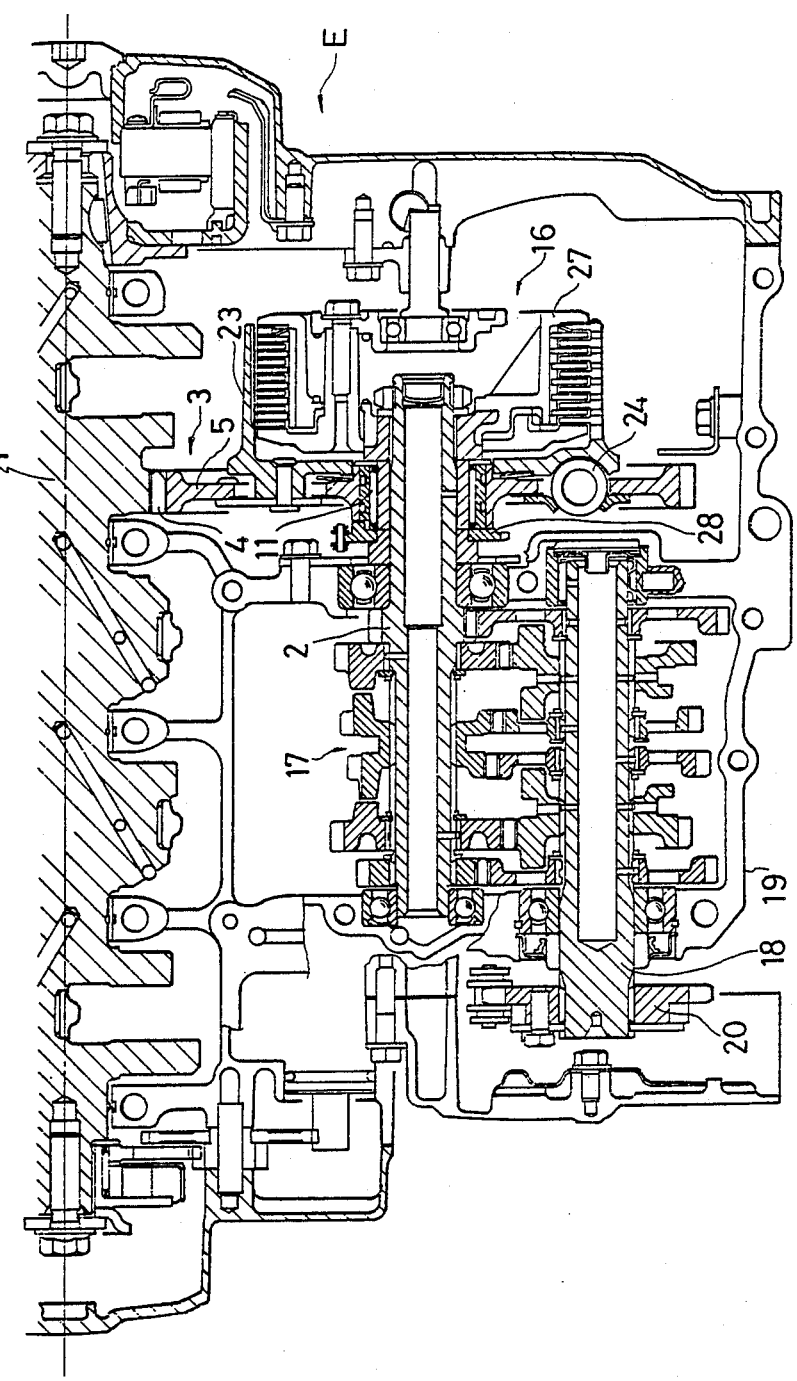

FIGS. 7 to 9 illustrate a still further preferred embodiment of the present invention. It is to be noted that in these figures, component parts similar to those used in the above-described embodiments are given like reference numerals. As shown in FIGS. 9A and 9B, a gear arrangement 3 according to this preferred embodiment is mounted between a crank shaft 1 and a main shaft 2 in an engine E for use in a motorcycle. The crank shaft 1 is driven in rotation by a piston 15 (FIG. 9A) which reciprocates within a cylinder 14, and a driving gear 4 in the gear arrangement 3 (FIG. 9B) according to the present invention is formed integrally with the crank shaft 1. A torque of the crank shaft 1 transmitted to the driven gear 5 which meshes with the driving gear 4 is in turn transmitted to the main shaft 2 via a clutch 16, and it is further transmitted to an output shaft 18 through a reduction gear system 17. One end of the output shaft 18 penetrates through a crank case 19 of the engine E and projects sideways, a driving sprocket 20 is fixedly secured to that end, and a rear wheel not shown is driven through a driving chain engaged with this sprocket 20.

The driven gear 5 is rotatable mounted via a needle bearing 11 around a bush 22 which is fitted around the main shaft 2. This driven gear 5 consists of a teeth portion 7 provided with teeth 6 along its outer circumference and a collar, that is, a shaft portion 8 supported via the needle bearing 11 around the main shaft 2 in a relatively rotatable manner as described above, and within a gap space between the teeth portion 7 and the shaft portion 8 are fitted O-rings 9, 9 in a compressed state. The above-described construction is quite similar to that in the above-described preferred embodiment, especially to that in the embodiment shown in FIG. 4, and as a matter of course, a tooth thickness of the tooth 6 is larger than a tooth thickness of the driving gear 4.

A drum-shaped clutch outer 23 is connected to one side surface of the driven gear 5 so as to rotate integrally with the driven gear 5. However, between the clutch outer 23 and the driven gear 5 is interposed a damper spring 24 directed in the circumferential direction, so that vibrations caused by fluctuation of rotation of the engine or the like may be absorbed thereby. The clutch outer member 23 is fixedly secured to a press metal member 26 on the opposite side of the driven gear 5 through a hole 25 of large diameter formed in the driven gear 5. A clutch inner 27 adapted to engage with this clutch outer 23, is connected to the main shaft 2. Accordingly, as a result of engagement between the clutch outer 23 and the clutch inner 27, a torque of the crank shaft 1 is transmitted through the driving gear 4 and the driven gear 5 to the main shaft 2, and so, the main shaft 2 rotates.

Now, in this particular embodiment, in order to avoid that the O-rings 9 would wear due to frictional forces in the circumferential direction which act upon the contact surface of the O-rings 9 faced to the teeth portion 7 and the shaft portion 8 and would influence the durability of the gear arrangement, relative slide movement in the circumferential direction between the teeth portion 7 and the shaft portion 8 is prevented by making use of a sprocket 28 that is mounted to the driven gear 5 for the purpose of driving an oil pump. The sprocket 28 is fixedly secured to the teeth portion 7 on the side of the driven gear 5 opposite to the above-described clutch outer 23, so that it may rotate integrally with the driven gear 5 about the same axis to drive an oil pump through a chain meshed with the sprocket 28.

On the end surface of this sprocket 28 opposed to the driven gear 5 are provided one or more engaging projections 29 along a circumferential line corresponding to the gap space between the teeth portion 7 and the shaft portion 8 of the driven gear 5. And on the side of the driven gear 5 are provided engaging recesses 30 at the positions corresponding to these engaging projections 29, and these engaging recesses 30 are provided so as to lie in both the teeth portion 7 and the shaft portion 8. Between the engaging projection 29 and the engaging recess 30 is provided a gap space in the radial direction that is enough to allow radial displacement of the teeth portion 7 relative to the shaft portion 8, and in the circumferential direction also a little gap space C is provided therebetween as shown in FIG. 8. However, since the teeth portion 7 and the shaft portion 8 are coupled to each other by the engaging projections 29 and hence rotate integrally, relative slide movement in the circumferential direction would scarcely occur therebetween, and so, the O-rings 9 would not wear due to friction. Modification could be made such that engaging projections aligning with each other are provided on the teeth portion 7 and the shaft portion 8, respectively, and an engaging recess adapted to engage with these engaging projections is provided on the side of the sprocket 28.

While the present invention has been described above in connection to a gear arrangement for transmitting rotation from a crank shaft of an engine to a main shaft, the present invention should not be limited to this gear arrangement, but as a matter of course, it is applicable to other appropriate gear arrangements.

What is claimed is:

1. A gear arrangement of first and second gears; one of said first and second gears comprising a shaft portion rotatably fitted around a support shaft, a teeth portion having teeth of a first tooth thickness on an outer circumference of said one of said first and second gears, and an elastic body interposed between an inner circumference of said teeth portion and an outer circumference of said shaft portion; an other of said first and second gears having teeth of a second tooth thickness, said first tooth thickness and said second tooth thickness being unequal; said first and second gears meshing with each other in a non-backlash condition whereby said teeth portion is pushed by said second gear to radially move with respect to said shaft portion and compress said elastic body; and said teeth portion is operatively coupled to said support shaft.

2. A gear arrangement as claimed in claim 1, in which said elastic body is spaced O-rings made of elastic material.

3. A gear arrangement as claimed in claim 2, in which pressurized oil is fed to a gap space between said spaced o-rings and between said teeth portion and said shaft portion.

4. A gear arrangement as claimed in claim 1, in which said elastic body is a corrugated annular spring.

5. A gear arrangement as claimed in claim 1, in which said teeth portion is coupled to said support shaft by a clutch.

6. A gear arrangement as claimed in any one of claims 1 or 5 in which an output rotary member engages said shaft portion and said teeth portion.

7. A primary reduction gear arrangement of an engine comprising a drive gear having teeth of a first tooth thickness mounted on a crankshaft; a driven gear having a shaft portion rotatably fitted around a main shaft, a teeth portion having teeth of a second tooth thickness on an outer circumference of said driven gear, and an elastic body interposed between an inner circumference of said teeth portion and an outer circumference of said shaft portion; a clutch coupling said teeth portion with said main shaft; said first tooth thickness and said second tooth thickness being unequal; and said drive gear and said driven gear are meshed with each other in a non-backlash condition whereby said teeth portion is pushed by said drive gear to radially move with respect to said shaft portion and compress said elastic body.

* * * * *